April 26, 1927.

S. SAIKAWA 1,626,097

ARRANGEMENT FOR TRANSFORMING DIRECT CURRENT VOLTAGE

Filed April 23, 1924   3 Sheets-Sheet 1

Inventor

Sakuhei Saikawa

By Edgar T. Brandenburg
Attorney

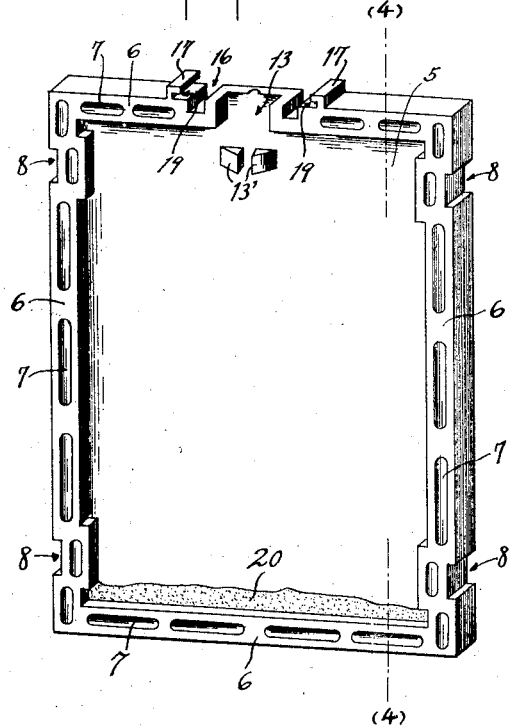
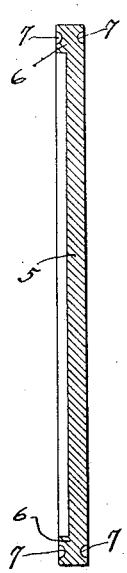
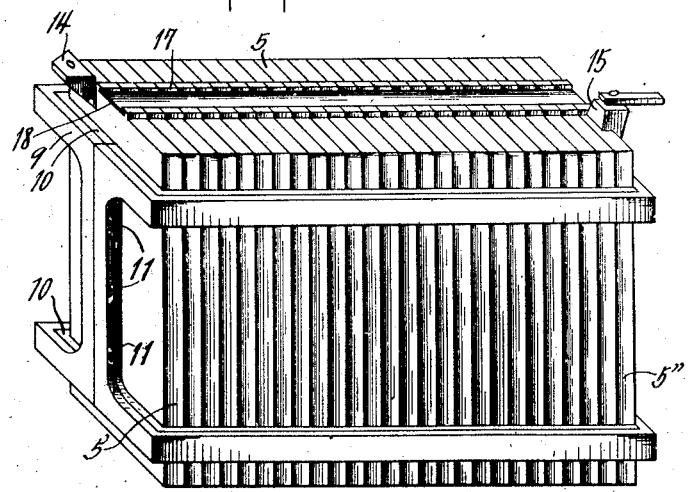

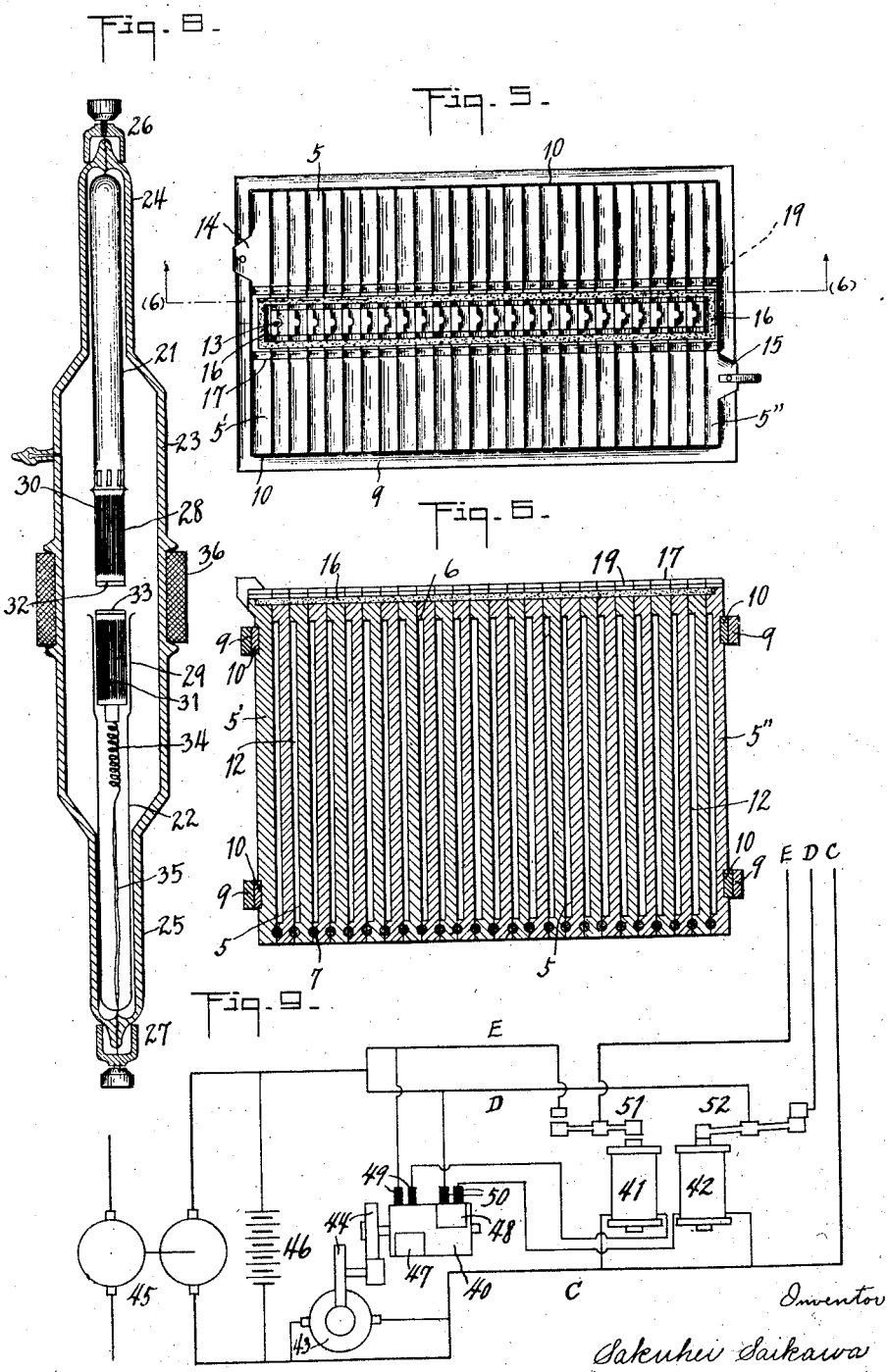

Patented Apr. 26, 1927.

1,626,097

UNITED STATES PATENT OFFICE.

SAKUHEI SAIKAWA, OF HIGASHINOJIRI-MURA, JAPAN.

ARRANGEMENT FOR TRANSFORMING DIRECT-CURRENT VOLTAGE.

Application filed April 23, 1924. Serial No. 708,469.

This invention relates to improvements in an arrangement for transforming a low voltage direct current to a high voltage direct current and vice versa.

Method of raising the voltage of a direct current by first charging a battery of storage cells in parallel and then re-connecting them into series by means of a suitable switching device, has been known heretofore.

This invention uses the same fundamental principle, but the carrying out of the same is rendered practicable by an ingenious construction of the storage cells employed and magnetically actuated switches working in a vacuum which are collectively controlled by means of an automatic device containing relays in such a manner that when one of the two groups of the cells is being charged in parallel the other is discharged in series.

In the annexed drawing, Figure 1 shows one of the two alternative phases of connection of the storage cells in the transforming arrangement according to this invention, each of the vacuum switches being in one position.

Figure 3 shows a perspective view of one of the plates of a storage cell in this invention.

Figure 4 shows a vertical section along the line (4)—(4) of Figure 3.

Figure 5 shows a plan of a storage cell as assembled for installation.

Figure 6 shows a vertical sectional view of the cell taken on the line (6)—(6) of the Figure 5.

Figure 7 shows a perspective view of the cell shown in Figures 5 to 6.

Figure 8 shows a longitudinal sectional view of a vacuum switch in my invention.

Figure 9 shows a diagram of connection of the automatic controlling device in this invention.

In the description that follows the invention will be explained more fully, reference being had to the characters and numerals of the drawings.

Figure 1:
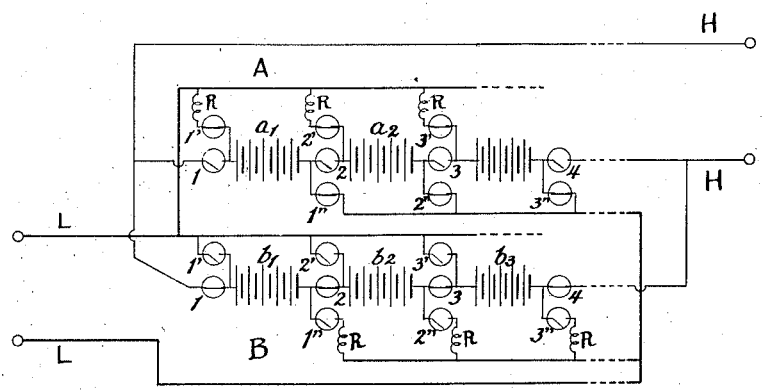
Figure 2:
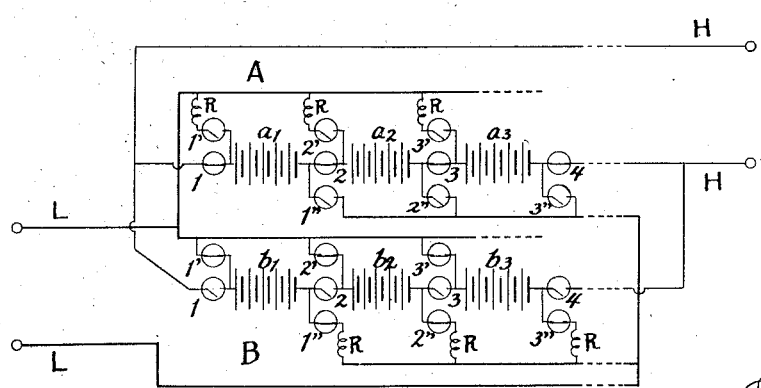
Figure 2 shows the same view when the connection is in the other phase, each of the vacuum switches being switched over to the other position.

In Figures 1 and 2, A and B are two groups of the storage cells consisting of the units $a^1$, $a^2$, $a^3$ and $b^1$, $b^2$, $b^3$ respectively. These units are connected alternately to the low voltage mains L L, in parallel and to the high voltage mains H H in series by the aid of the vacuum switches 1, 2, 3, 4 and 1', 2', 3', 4', the voltage of any one of the units corresponding to the line voltage of the low-tension side L L.

In the figures, only three of each of the units $a^1$, $a^2$, $a^3$ and $b^1$, $b^2$, $b^3$ have been shown for the sake of simplicity. But it is to be understood that the number of such units should be varied according to voltage of the high tension side H H.

To convert the low voltage current supplied at the low tension side L L to a high voltage current to be sent out to the high tension side H H, all the central switches 1, 2, 3, 4 of one or the other of the groups, say the first group A are opened and all the side switches 1', 2', 3' and 1", 2", 3" of the same group are closed, at the same time the central switches 1, 2, 3, 4 of the second group B are closed and the side switches 1', 2', 3' and 1", 2", 3" thereof are opened as shown in Figure 1.

In this operation, all the units $a^1$, $a^2$, $a^3$ of the first group A are connected in parallel on to the low tension lines L L, to be charged therefrom, and all the units $b^1$, $b^2$, $b^3$ of the group B are connected in series to the high tension lines H H, thereby discharging the energy stored in the previous operation.

After a short while, all the switches in both groups are reversed to bring them to the respective position shown in Figure 2, this connects the group A in series to the high tension lines H H, discharging itself, and the group B in parallel to the low tension lines L L to be charged thereby.

These two operations repeated regularly and indefinitely at a period of a few seconds, for example, it is possible to convert a low voltage direct current to a high voltage direct current with practically no break-points. In this case, the ratio of transformation will be equal to the number of battery units in one of the groups A or B. To prevent the harmful rush of current into one of the units due to the lack of perfect synchronism of operation of the vacuum switches, a suitable reactance coil R should be provided in each of the battery units.

As has been mentioned hereinbefore the method of raising voltage of a direct current which consists in that a multiplicity of storage cells are first charged in parallel and then discharged in series is not new.

In this invention, although the same fundamental idea has been adhered to, it differs in three essential features from any of the known arts, that is to say, firstly, the storage cells of special construction are used so as to enable us to place a very large number of them in a limited space, secondly, by using special switches which make and break electric circuits within a high vacuum, it has been found possible to handle a high voltage direct current, thirdly, these switches are automatically handled collectively by means of a controlling device so as to change the connections of the storage battery units from the series to the parallel or á series-parallel connection, and vice versa.

In the following description these parts will be explained more fully in successive order.

Storage cells.

This invention deals with a direct current of extra-high voltage and consequently requires a large number of storage cells. To enable to accommodate a large number of cells within a limited space, each electrode plate has a projection of a uniform height extending the whole periphery, contacting along this projection with the back surface of the adjoining plate and forming between the two plates a liquid tight space for holding the electrolyte therein.

Figure 3 shows in perspective one of the plates of the storage cell in this invention. This plate 5 is made of lead alloy containing 3 to 5 per cent antimony which is added to increase rigidity. Along the whole periphery of the plate except the top thereof, there is formed a platform-like elevation 6 of uniform width and height. On the front and the back side of this platform there are formed a plurality of cavities 7, in which is placed an acid-proof insulating compound. For such a compound, a paste formed of a mixture of asphalt and heavy oil with an addition of small quantity of resin may advantageously be employed. A multiplicity of such plates are brought together one over the other through the interposition of an insulating belt impregnated with the paste above mentioned, to form a rectangular box-like unit as shown in Figures 5 to 7. To the grooves 8 formed on the lateral surface of the box is fitted a metallic frame 9 through the intermediary of a suitable acid-proof insulation 10, and then all the plates are tightened by means of a set of bolts 11. The enclosed spaces 12 formed between two adjoining plates serve as the containers of electrolyte. The electrolyte may be introduced from the opening 13 provided on the upper part of the platform 6. It is advisable to employ a specially designed apparatus which enables us to introduce electrolyte to all the rooms 12 at one time. The projections 13′ will serve as a means to hold the nozzles of such apparatus. These projections will at the same time serve as a mark to the level of which the electrolyte should be poured into.

Each of the two end plates 5′ and 5″ has only one active surface. They are made slightly thicker than the intermediate ones and are provided with the extensions 14 and 15 for the purpose of connecting the leading wires.

On the upper edge of each of the plates and around the opening 13, there are formed grooves 16, 16 and projections 17, 17. These grooves 16 when the plates are superposed one over the other will form into an endless groove of a rectangular shape (see Figure 5). In this groove an insulating packing material such as used for the filling of the cavities 7 is placed to prevent the creeping out of electrolyte through the opening 13 due to capillary action. The whole area composed of the series of the opening 13 is ordinarily shut off from the exterior by sliding a covering plate 18 through the channels 19, 19. The lower part of the plates 5 is covered with a coating 20 of an insulating material, such as asphalt for example, to prevent short circuiting due to the falling off of the active material from the plate.

In this invention, the storage cells are charged and discharged only for a few moments and the thickness of the plates need not be large, a thickness amounting to ½ to 1 millimeter being sufficient. Its required surface area depends of course on the magnitude of the current used. If we take as the current density 2.7 amps. for a $dm^2$, for example, for 12 amps. of the current used, the required surface area will be 4.5 $dm^2$ approximately. Suppose now that the terminal voltage of each of the battery units, that is to say, the voltage of the low tension side in Figure 1 or 2 is 165 volts, the required number of plates for one unit will be $$165 \div 2.05 + 1 = 81,$$

taking the E. M. F. of a cell as 2.05 volts. Assuming the thickness of each plate and the clearance between the successive plates each 7 mm. the over-all length of the unit will amount to 56 cm. approximately. The capacity is $165 \times 12 = 1980$, or 2 k. w. approximately. Thus we will see how small the volume and consequently the weight per k. w. is in the storage battery according to this invention.

As has been stated hereinbefore, the storage cells in this invention being charged and discharged only for a few moments the chemical changes which takes place in them are superficial. The active material, especially the lead peroxide, which is formed on the surface of the plate composed of hard lead is fine-grained and compact and fastly adheres to the ground plate. Therefore it will not come off easily. Moreover since the charging and the discharging are carried on very rapidly in succession, the amount of polarization is exceedingly slight. Also almost no local action takes place on account of difference in concentration. Consequently no extra loss other than that due to the internal resistance can take place even when a large number of cells be arranged in cascade, and the curves of charging and discharging come very close to each other, the efficiency amounting to as high as 95 to 97 per cent. In charging no ebullition of gas can be witnessed for a very high current density. This is because such a high current density at 2.7 amps. per $dm^2$ could be chosen. If preferred, a suitable amount of boracic acid may be introduced to the electrolyte to limit the depth to which chemical changes would take place.

Vacuum switches.

Figure 8 shows a vacuum switch employed in this invention. It mainly consists of two aluminum tubular bodies 21, 22 inclosed in the glass bulb 23 and fixed tightly at its neck portions 24, 25. The aluminum bodies 21, 22 are connected to the terminals 26, 27 through the platinum wires sealed within the glass. The free ends 28, 29 of the aluminum tubes 21, 22 are each formed into a tubular pocket pierced with a number of small holes. Within these pockets are placed a bundle of soft-iron wires 30 and 31. The bundle of iron wires 30 contained in one of the pockets 28 is fixed so as to be immovable by means of a cover 32 made of an infusible metal. On the contrary, the bundle of iron wires 31 in the other pocket 29 is placed in a metallic cylindrical case provided with a cover 33 made of an infusible metal and is made movable in the axial direction. This case is electrically connected with the terminal 27 through the leading wire 35 and a metallic spiral spring 34.

At the central portion of the glass bulb 23 and surrounding the two pockets 28, 29 is disposed an exciting coil 36. When this coil is energized the movable core 31 will be attracted towards the fixed core 30 so as to touch with the same and thereby close the high tension circuit to which the vacuum switch in question is inserted. When the coil 36 is de-energized, the movable core 31 will be attracted and restored to its original position by means of the spiral spring 34, breaking thereby the high tension circuit.

The bulb 23 is highly exhausted, so that its interior is at an extremely high vacuum excluding all possibilities of formation of an arc between the two electrodes when the circuit is broken between them. It is preferable that the vacuum switches be immersed as a whole in a bath of an insulating oil.

The fact that the tubular bodies 21, 22 and the pockets 28, 29 are pierced with small holes, as well as, that the cores 30, 31 are composed of iron wires are with the view that the gases contained within their bodies can be easily driven off.

Switch controlling device.

Figure 9 is a diagrammatic representation of the automatic device by means of which the vacuum switches 1, 2, 3, 4, 1', 2', 3', and 1", 2", 3" are collectively controlled according to the sequence hereinbefore mentioned. In this figure, 40 is a rotating drum made of insulating material, by means of which the currents to the exciting coils 36 of the vacuum switches are made and broken. 41, 42 are relays, 43 is an electric motor driving the drum 40 through the intermediary of the reduction gearing 44, 45 is a motor-generator operated by any suitable source of power, and 46 is an electric battery installed and kept in reserve.

The drum 40 is provided with metallic sliding segments 47, 48, each extending exactly half a circumference of the drum and disposed in an alternate manner so that when a pair of brushes 49, 49 are short-circuited, the other pair 50, 50 are not, there not existing the slightest gap between the short-circuiting of one pair and the other pair of the brushes. One of the brushes 49 is directly connected to the feeder E while the other is connected to the common feeder C through one of the relays 41. In the same manner, one of the brushes 50 is directly connected to the feeder D while the other is connected to the common feeder C through the other relay 42. Thus, when the drum 40 is rotated slowly, say at the rate of ten revolutions per minute, two pairs of the brushes 49 and 50 will be short-circuited alternately for a period of exactly equal to half a revolution of the drum energizing the two relays 41 and 42 and actuating the rocker switches 51, 52 alternately without the slightest gap in the operation.

Suppose we have connected on one hand all the central switches 1, 2, 3, 4 of the first group A and all of the side switches 1', 2', 3', and 1", 2", 3" of the second group B (Figures 1 and 2) to the feeders E and C, and on the other hand all the side switches of the group A and all the central switches of the group B to the feeders D and C, then as long as the pair of brushes 49 are short-circuited by the semi-circular segment 47, the battery units of the group A will, connected in series, discharge on to the high-tension lines H H, while those of the group B will, connected in parallel, be charged from the low-tension mains. Subsequently, as the brushes 49 are released and at the same time the other pair of brushes 50 engage with and are short-circuited by the segment 48, the units of the group A will, being connected in parallel, be charged, while the units of the group B will, being connected in series, discharge on to the high tension mains. The current which the relays make and break is large, but the current which the drum makes and breaks is small. Therefore there are no sparks sufficiently severe to do any substantial harm to the sliding segments in spite of the slow rotation of the drum.

In the above the invention has been mainly described with reference to the raising of voltage. It is evident, however, that the arrangement may equally be applied without any substantial modification whatever to the lowering of a direct current voltage.

The high tension direct current which the arrangement according to this invention generates has no sensible discontinuities. But even these slight discontinuities, if there be any, may be made perfectly harmless by inserting sufficiently large reactance coils at the suitable points of the secondary circuit.

What I claim is:—

1. In apparatus for transforming the voltage of a direct current, comprising in combination two groups of storage batteries, a pair of mains supplying the voltage to be transformed and another pair to receive the transformed voltage, conductors by which each group of batteries may be connected either in series or in multiple across one pair of mains, electrically operable automatic switches to control the current in the conductors, and an automatic device for collectively operating the switches in such manner that all units of one group of batteries are momentarily connected in series across one pair of mains, while simultaneously connecting all units of the second group of batteries in multiple across the other pair of mains.

2. In apparatus for transforming the voltage of a direct current, comprising in combination two groups of storage batteries, a pair of mains supplying the voltage to be transformed and another pair to receive the transformed voltage, conductors by which each group of batteries may be connected either in series or in multiple across one pair of mains, electrically operable automatic switches to control the current in the conductors, and an automatic device for collectively and periodically operating the switches in such manner that all units of one group of batteries are momentarily connected in series across one pair of mains, while simultaneously connecting all units of the second group of batteries in multiple across the other pair of mains.

3. In apparatus for transforming the voltage of a direct current, comprising in combination two groups of storage batteries, a pair of mains supplying the voltage to be transformed and another pair to receive the transformed voltage, conductors by which each group of batteries may be connected either in series or in multiple across one pair of mains, electrically operable automatic switches to control the current in the conductors, and an automatic device for collectively and periodically operating the switches in such manner that all units of one group of batteries are momentarily connected first in series across one pair and then in parallel across the second pair of mains, while simultaneously connecting all units of the second group of batteries first in multiple across the said second pair of mains and then in series across the other pair of mains, whereby one group of batteries is connected to periodically and momentarily receive current from the supply mains at one voltage, while the second group for the like interval is connected to supply current at a different voltage to the other pair of mains.

4. In apparatus for transforming direct electric currents, comprising in combination two groups of storage batteries, a supply circuit at one voltage, a load circuit at a different voltage, conductors by which each group of batteries may be connected either in series or in multiple with one or the other circuit, vacuum switches operable to control the current in the said conductors, the said switches each comprising a highly evacuated bulb containing switch contacts, an electromagnet associated with the bulb and operable when energized to actuate the switch contacts therein, and an automatic device for simultaneously controlling all of the switches collectively in such manner that all units of one group of batteries are momentarily and periodically connected in series in one circuit, while all the units of the second group are in the same manner and for the like period connected in multiple in the other circuit.

5. In apparatus for transforming direct electric currents, comprising in combination two groups of storage batteries, a supply circuit at one voltage, a load circuit at a different voltage, conductors by which each group of batteries may be connected either in series or in multiple with one or the other circuit, vacuum switches operable to control the current in the said conductors, the said switches each comprising a highly evacuated bulb containing switch contacts, an electromagnet associated with the bulb and operable when energized to actuate the switch contacts therein, a motor-driven commutator for controlling the operation of said electromagnets collectively in such manner that the switch contacts will be operated to momentarily and periodically connect all the units of one group of batteries in series in one circuit, while connecting in multiple all units of the second group of batteries in the other circuit, whereby each group will momentarily and periodically receive current from the supply circuit at one voltage, while the other group is connected to maintain a different voltage on the load circuit.

In testimony whereof I affix my signature.

SAKUHEI SAIKAWA.